UNITED STATES PATENT OFFICE.

OLIVER P. M. GOSS, OF SEATTLE, WASHINGTON.

ART OF IMPREGNATING TIMBER AND OTHER POROUS MATERIAL WITH A PRESERVATIVE.

1,167,492.     Specification of Letters Patent.     Patented Jan. 11, 1916.

No Drawing.     Application filed February 10, 1915. Serial No. 7,389.

*To all whom it may concern:*

Be it known that I, OLIVER P. M. Goss, a citizen of the United States, and a resident of Seattle, county of King, and State of Washington, have invented a certain new and useful Improvement in the Art of Impregnating Timber and other Porous Material with a Preservative, of which the following is a specification.

My improvement is more particularly designed for the treatment of timber such as railroad ties, paving blocks, wood-stave pipe, lumber, etc.

In the present mode of treating timber there is a waste of the preservative material, by reason of an excess of the latter being used; and furthermore, the timber is not left in good shape for handling, because the excess of preservative material exudes from the pores of the timber and produces a condition called "bleeding," while it is desirable that the timber after treatment be surface-dry.

The object of my improvement is to effect economy in the quantity of preserving fluid used, to simplify the process of impregnating the timber or other material, and to insure that the material will be dry after treatment.

I attain my object by pursuing the following method: I place the timber to be treated in a retort made with a door adapted to be hermetically sealed. Then I introduce the preservative fluid into the retort, after which I heat the fluid to a temperature of approximately 230 degrees Fahrenheit, and maintain this temperature from 1 to 40 hours, according to the condition of the material; green timber taking longer than seasoned timber. At the end of this step, I empty the retort of the preserving fluid and by any convenient means draw a vacuum in the retort of approximately 23 to 28 inches and maintain this condition for upward of half an hour and simultaneously heat the retort so that the gases in the retort will have a temperature of from 150 to 230 degrees Fahrenheit. This step has for its purpose to vaporize and draw off any moisture and gases in the pores of the timber, to season the latter, and to prepare it for the driving in of the preservative. After the timber has been sufficiently dried by this step, the operation of the vacuum producing means is discontinued, but I leave said vacuum in the retort. I then break such vacuum by filling the retort with the preserving fluid by means of a pump; and through the medium of the latter I finally apply sufficient pressure to drive into the timber a volume of the preserving fluid, ranging from five to twenty pounds per cubic foot. I then reheat the retort so as to impart to the preserving fluid a temperature of from 200 to 240 degrees Fahrenheit, and continue such reheating from one to six hours in order to expand the liquids, gases, etc. within the pores of the timber, and in so doing driving out the surplus preservative. In fact, after the last mentioned step, the walls of the pores will be merely painted, as it were, with the preserving fluid. Finally, for the purpose of drying in the preservative and drying the surface of the material, I draw off the preserving liquid from the retort and create a vacuum in the latter from 23 to 28 inches. This vacuum is produced in the retort while the material is still hot from its previous reheating in the retort as mentioned, and operates to draw the surplus air from the pores of the material. The material is then removed from the retort and permitted to cool in the open, in so doing a partial vacuum is created in the material which operates to further draw in the preservative and thereby causes the penetration of the latter to a greater depth of the pores and also operates to render the surface of the material dry.

In describing my process, I necessarily stated a wide range in the degree of heating and of the vacuum produced, and in the length of time during which the material is to be subjected to such treatment, because it is impossible to state these matters more specifically, since different timbers, for example, have different natures and require variance in the treatment applied; and thus the specific intensity of each treatment, and the length of time of such treatment must in most instances be ascertained by preliminary trial.

I claim:

1. In the preserving treatment of porous material, the method which consists in immersing the material in the preservative fluid contained in a closed container and then heating the fluid to approximately 230 degrees Fahrenheit, then emptying the container of the preserving fluid and drawing a vacuum therein of from 23 to 28 inches approximately and simultaneously heating the interior of the container to a temperature of from 150 to 230 degrees Fahrenheit, and continuing such treatment for upward of half an hour, then breaking the vacuum in the container by the re-introduction therein of the preserving fluid, then applying pressure to the fluid sufficient to force into the pores of each cubic foot of the material approximately five to twenty pounds of the fluid.

2. In the preserving treatment of porous material, a method which consists in immersing the material in the preservative fluid contained in a closed container and then heating the fluid to approximately 230 degrees Fahrenheit, then emptying the container of the preserving fluid and drawing a vacuum therein of from 23 to 28 inches approximately and simultaneously heating the interior of the container to a temperature of from 150 to 230 degrees Fahrenheit, and continuing such treatment for upward of half an hour, then breaking the vacuum in the container by the re-introduction therein of the preserving fluid, then applying pressure to the fluid sufficient to force into the pores of each cubic foot of the material approximately five to twenty pounds of the fluid, then reheating the fluid in the container for from one to six hours continuously to a temperature of from 200 to 240 degrees, then emptying the container of the preserving fluid and while the fluid is still hot, drawing a vacuum in the container of from 23 to 28 inches approximately.

OLIVER P. M. GOSS.

Witnesses:
WM. C. SCHMITT,
D. E. CRABB.